United States Patent
Shimomura et al.

(10) Patent No.: US 6,794,855 B2
(45) Date of Patent: Sep. 21, 2004

(54) VOLTAGE STABILIZATION CONTROL METHOD AND VOLTAGE STABILIZATION CONTROL APPARATUS

(75) Inventors: Masaru Shimomura, Tokyo (JP); Yuou Xia, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 209 days.

(21) Appl. No.: 10/175,866

(22) Filed: Jun. 21, 2002

(65) Prior Publication Data

US 2003/0057924 A1 Mar. 27, 2003

(30) Foreign Application Priority Data

Sep. 21, 2001 (JP) ........................................ 2001-289926

(51) Int. Cl.[7] ........................... H02H 7/06; H02P 11/00; H02P 9/00; H02P 9/10
(52) U.S. Cl. .............................. 322/59; 322/20; 322/45
(58) Field of Search .............................. 322/59, 28, 45, 322/20, 24, 26; 318/700, 714; 323/205, 301

(56) References Cited

U.S. PATENT DOCUMENTS

| | | | | |
|---|---|---|---|---|
| 4,967,129 A | * | 10/1990 | Tanaka | 318/621 |
| 5,604,420 A | * | 2/1997 | Nambu | 322/19 |
| 5,698,968 A | * | 12/1997 | Takagi et al. | 322/58 |
| 6,014,015 A | * | 1/2000 | Thorne et al. | 322/15 |
| 6,265,852 B1 | * | 7/2001 | Kitamura et al. | 322/59 |
| 6,323,618 B1 | * | 11/2001 | Kitamura et al. | 318/700 |
| 6,329,773 B1 | * | 12/2001 | Xia et al. | 318/140 |
| 6,338,009 B1 | * | 1/2002 | Sato et al. | 700/286 |

FOREIGN PATENT DOCUMENTS

| | | | | |
|---|---|---|---|---|
| JP | 4-079798 | | 3/1992 | |
| JP | 407163056 A | * | 6/1995 | |

OTHER PUBLICATIONS

Michigami, T. et al.; "Development of Advanced Excitation System . . . Power Transmission System", *T. IEEE Japan*, vol. 110–B, No. 11, (1990).

* cited by examiner

*Primary Examiner*—Joe Waks
*Assistant Examiner*—Julio Gonzalez Da Silva
(74) *Attorney, Agent, or Firm*—Leydig, Voit & Mayer, Ltd.

(57) ABSTRACT

A voltage stabilization control method for controlling a voltage of a power system that is connected to an adjustable speed machine includes detecting an active power change of the power system; outputting a control signal indicative of the amount of adjustment when the adjustment of the active power of the adjustable speed machine is required on the basis of the active power change; and receiving a steady operation command value with respect to the adjustable speed machine, generating a stabilization control signal resulting from adding the control signal to the steady operation command value and outputting the stabilization control signal to the adjustable speed machine. The present invention also resides in a voltage stabilization control apparatus.

19 Claims, 5 Drawing Sheets

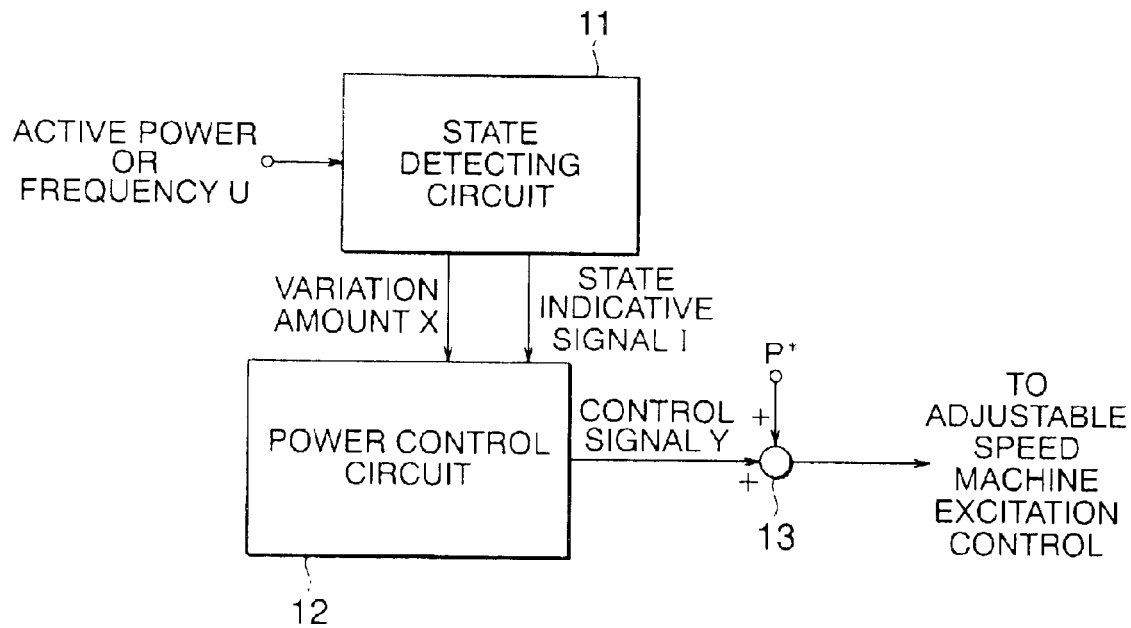
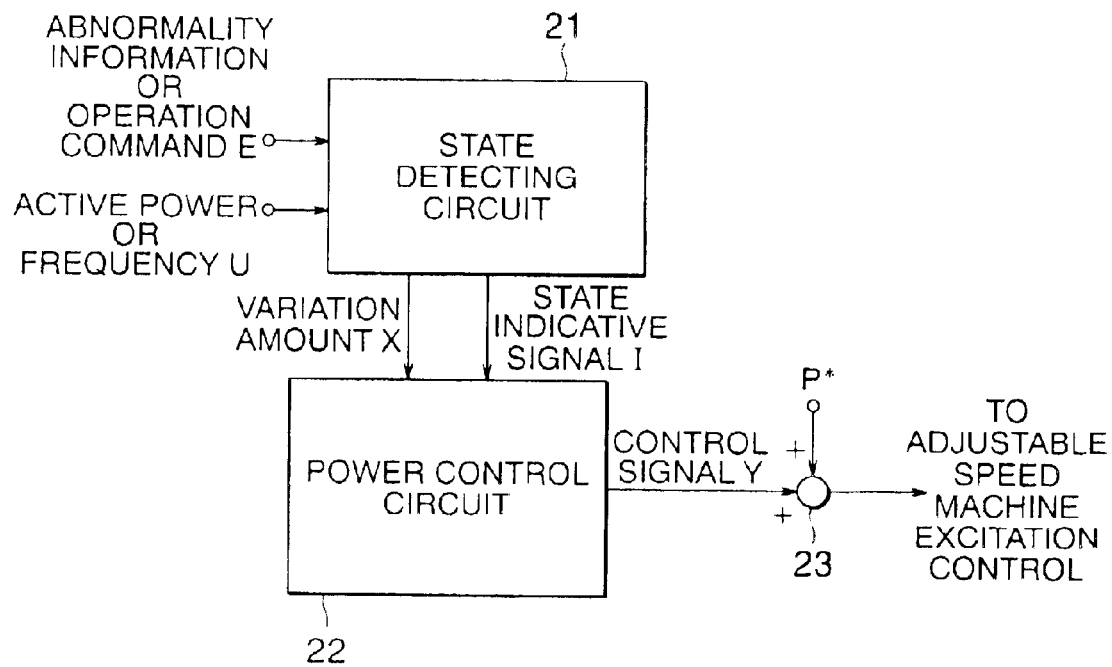

VOLTAGE STABILIZATION CONTROL METHOD AND VOLTAGE STABILIZATION CONTROL APPARATUS

BACKGROUND OF THE INVENTION

1. Field of the Invention

The present invention relates to a voltage stabilization control method, and more particularly to an improvement in voltage stability of a power system in a voltage stabilization control method for the power system due to an adjustable speed machine.

2. Description of the Related Art

Hitherto, in order to improve voltage stability of the power system, there are used a control unit and a control system in which a transmission voltage is controlled to a constant value by an excitation control unit such as a PSVR (power system voltage regulator) or an HSVC (high side voltage control), or a reactive power is compensated by a phase modifier such as an SVG (statcom). In general, a relation between the transmission voltage and a terminal voltage of the power generator is represented by the following expression.

$$V_H = V_g - I_q \cdot X_t \tag{1}$$

Where $V_H$ is a transmission voltage at a higher voltage side of a main transformer connected with a terminal of a synchronous machine, $V_g$ is a terminal voltage of the synchronous machine, $I_q$ is a reactive current, and $X_t$ is a leakage reactance of the main transformer.

Since a normal voltage control controls the terminal voltage of the synchronous machine constantly, when the system voltage is lowered, the transmission voltage $V_H$ drops together with a drop of the system voltage as the reactive current $I_q$ increases. On the contrary, according to the transmission voltage constant control method such as the PSVR or the HSVC, the transmission voltage can be maintained so as to compensate an amount as large as the dropped amount corresponding to the reactance of the transformer by increasing the terminal voltage of the synchronous machine. Also, in the phase modifier such as the SVG, the reactive current is compensated, thereby being capable of preventing the transmission voltage from dropping.

FIG. 8 is a simplified circuit diagram showing a known general transmission system. In the figure, reference numeral 100 denotes a synchronous machine of a sending end, 101 is a transmission line that connects a transmission end and a receiving end, 102 is a load of the receiving end, and 103 is a transmission line impedance. FIG. 9 shows a characteristic (P-V curve) of an active power to a voltage of the transmission system shown in FIG. 8. Referring to FIG. 9, reference symbol C11 is a PV characteristic of the transmission system, and C21 is a load characteristic. In a normal state, the power system operates at an equilibrium point of an intersection A of C11 and C12. When the transmission line impedance increases due to a transmission line fault or the like, the characteristic of the transmission system largely changes. For example, in the case where the transmission characteristic is reduced to C12 after the fault but the load characteristic cannot be extended over C22, the transmission characteristic and the load characteristic cannot intersect with each other, with the result that the operation equilibrium point is lost and a voltage drop or a voltage breakdown. In the case where a component of a non-linear load such as a constant power load or an inductor load is large, or in the case where a tap changer such as an LTC is limited, the possibility that such a situation may occur is high. In order to prevent this circumstance, the transmission characteristic, after the fault is extended up to C13, can intersect with the load characteristic. In other words, when the active power which is short circuited at the load is quickly supplied, the transmission system can not be saved from the voltage drop or the voltage breakdown. However, in the conventional voltage control and reactive power control, the active power cannot be supplied. Also, in the case of a synchronous machine, because control of the active power can be conducted only by a speed control system, the power cannot be controlled at a high speed.

As shown in FIG. 9, it is generally known that there is a voltage stability limit H in the transmission characteristic C11 that is in a steady operation state. However, when the operation equilibrium point becomes lower than H, the voltage fluctuates. The value of the stability limit H changes by using the HSVC, the PSVR or the phase modifier. There is a fear that the operation equilibrium point enters an unstable region due to acceleration of the generators connected to the transmission system after an accident has been removed, or a rapid request at the load side. In this case, it is necessary to suppress the power that rapidly increases in the transmission system, but control cannot be conducted so as to absorb an increasing power of the transmission system and maintain the voltage of the transmission system by only the conventional voltage control and reactive power compensation. Also, in case of a synchronous machine, because the control of the active power can be controlled by only the speed control system, the power cannot be controlled at a high speed.

As described above, in the case where the power is short circuited at the load side due to the transmission line fault or the load is rapidly changing, if the active power that is short circuited at the load can be rapidly supplied, the voltage drop of the transmission system or the voltage breakdown can be prevented. However, in conventional voltage control and reactive power control, because the active power cannot be supplied, when a fault or the like occurs, a voltage drop and a voltage collapse occurs in the transmission system.

Also, there is a fear that the operation equilibrium point enters an unstable region due to acceleration of the generators connected to the transmission system after a fault has been removed, or upon a rapid request for power at the load side. In this case, because it is impossible to absorb the increasing power of the transmission system at a high speed and maintain the voltage of the transmission system by conventional voltage control and reactive power compensation, there arises a voltage drop of the transmission system and a voltage collapse occurs.

SUMMARY OF THE INVENTION

The present invention has been made to solve the above-mentioned problems, and therefore an object of the present invention is to obtain a voltage stabilization control method and apparatus each of which is capable of stopping a voltage drop of the transmission system and preventing the voltage collapse by supplying an active power to a load at a high speed when the active power is short at the load, and absorbing the power when the power rapidly increases in the transmission system.

With the above object in view, the voltage stabilization control method of the present invention for controlling a voltage of a power system that is connected with an adjustable speed machine, comprises the steps of: detecting a change of a condition of the power system; outputting a control signal indicative of the amount of adjustment when the adjustment of the active power of the adjustable speed machine is required on the basis of the change of the condition of the power system; and receiving a steady operation command value with respect to the adjustable speed machine, generating a stabilization control signal resulting from adding the control signal to the steady operation command value and outputting the stabilization control signal to the adjustable speed machine.

Therefore, the active power of the adjustable speed machine connected to the power system is controlled at a high speed in correspondence with the active power change of the power system, thereby making it possible to suck or supply the power at the control target position and to stop the voltage drop of the transmission system, whereby the voltage collapse can be prevented.

Also, the change of the condition of the power system may comprise an active power change of the power system, a frequency change of the power system or a voltage change of the power system.

The present invention resides in a voltage stabilization control system for controlling a voltage of a power system that is connected with an adjustable speed machine.

BRIEF DESCRIPTION OF THE DRAWINGS

These and other objects and advantages of this invention will become more fully apparent from the following detailed description taken with the accompanying drawings in which:

FIG. 1 is a diagram for explanation of an operation of a voltage stabilization control method in accordance with a first embodiment of the present invention;

FIG. 2 is a diagram for explanation of an operation of a voltage stabilization control method in accordance with a second embodiment of the present invention;

DETAILED DESCRIPTION OF THE PREFERRED EMBODIMENTS

Figure 3:
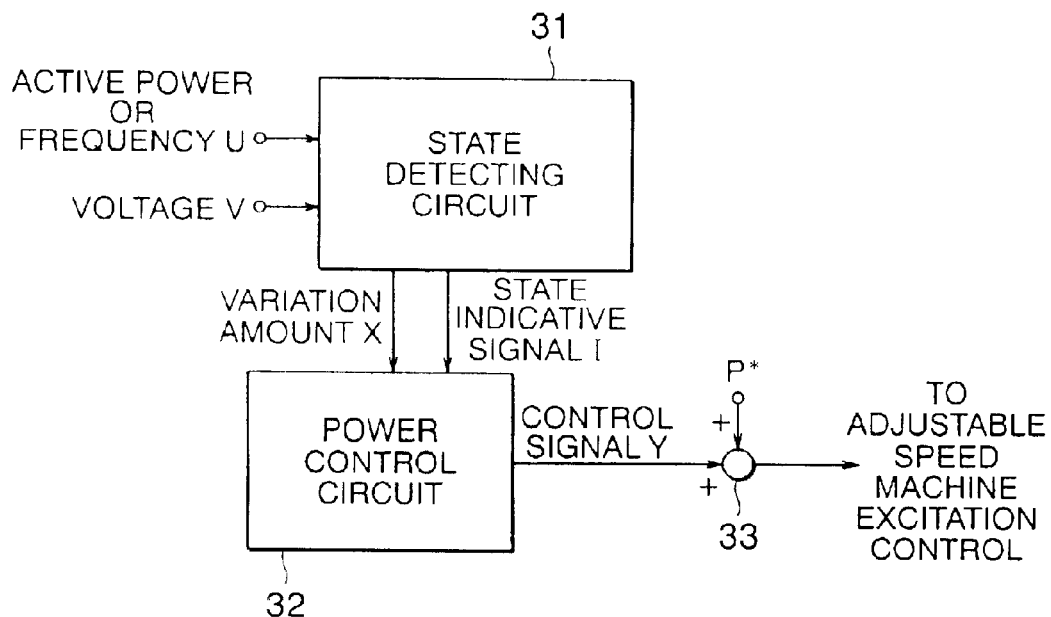
FIG. 3 is a diagram for explanation of an operation of a voltage stabilization control method in accordance with a third embodiment of the present invention.

Now, a description will be given in more detail of the preferred embodiments of the present invention with reference to the accompanying drawings.

First Embodiment

FIG. 1 is a block diagram for explanation of a power system voltage stabilizing method in accordance with a first embodiment of the present invention. In the figure, reference numeral 11 denotes a state detecting circuit for detecting a system frequency change or an active power change at a control target point, 12 denotes a power control circuit for outputting a control signal for restoring an increase or a decrease in the active power at the control target point, and 13 denotes a signal adder.

Subsequently, a description will be given of an operation principle of the power system voltage stabilizing method according to the first embodiment of the present invention.

The state detecting circuit 11 always monitors an operation state and outputs to the power control circuit 12, a state indicative signal I of 0 when the state is normal, a state indicative signal I of 1 when the system frequency or the active power at the control target point increases to a rated value or more, a state indicative signal I of −1 when the system frequency or the active power at the control target point decreases to the rated value or less, and a variation amount X (represented by a predetermined function X=f(U)) such as a deviation of the frequency or the active power or a change speed as represented by the following expressions.

$I=0$ when $Uu>U>Ul$, $I=1$ when $U>Uu$, $I=-1$ when $U<Ul$, and $X=f(U)$

Where I is a state indicative signal, U is an active power or frequency, Ul is a lower limit rated value of the active power or the frequency, and Uu is an upper limit rated value of the active power or the frequency.

As represented by the following expressions, the power control circuit 12 outputs 0.0 to the signal adder 13 when receiving I='0' from the state detecting circuit 11. The power control circuit 12 outputs to the signal adder 13, a control signal Y that allows an increase in the active power at the control target point to be restored at a high speed by a variation amount X detected by the state detecting circuit 11 or a function prepared in advance when receiving I='1'. The power control circuit 12 outputs to the signal adder 13, the control signal Y that allows a decrease in the active power at the control target point to be restored at a high speed by a variation amount X detected by the state detecting circuit 11 or a function prepared in advance when receiving I='−1'.

Y=F(x, I, t) (example: PID), or

Y=f(I, t) (example: step function).

The signal adder 13 receives a steady operation command value P* of an adjustable speed machine and adds an output of the power control circuit 12 to a value of the P* to output the added value to an excitation control system of the adjustable speed machine.

As described above, in this embodiment, the excitation control system of the adjustable speed machine controls the active power of the adjustable speed machine in accordance with the steady command value when the excitation control system of the adjustable speed machine normally operates. However, when an increase or a decrease in the power at the control target point is detected, the power control signal is supplied to the excitation control system of the adjustable speed machine to adjust (absorb or supply) the active power of the adjustable speed machine, thereby making it possible to restore the increase or the decrease in the transmission power of the transmission system at a high speed and to stop a voltage drop in the transmission system, whereby the voltage collapse can be prevented.

Second Embodiment

FIG. 2 is a block diagram for explanation of a power system voltage stabilizing method in accordance with a second embodiment of the present invention. In FIG. 2, reference numeral 21 denotes a state detecting circuit for detecting a fault signal indicative of a system frequency change or an active power change at a control target point and a fault occurrence or a load rapid change, 22 denotes a power control circuit for outputting a control signal for restoring an increase or a decrease in the active power at the control target point, and 23 denotes a signal adder.

Subsequently, a description will be given of an operation principle of the power system voltage stabilizing method according to the second embodiment of the present invention.

The state detecting circuit 21 always monitors an operation state and outputs to the power control circuit 22, a state indicative signal I of 0 when the state is normal, a state indicative signal I of 1 when the system frequency or the active power at the control target point increases to a rated value or more and receiving the abnormality information of a power increase or an operation command, a state indicative signal I of −1 when the system frequency or the active power at the control target point decreases to a rated value or less, and the state detecting circuit 21 receives the abnormality information of the power increase or the operation command, and a variation amount X such as a deviation of the frequency or the active power or a change speed as represented by the following expressions.

$I=0$ when $Uu>U>Ul$ and $E=0$, $I=1$ when $U>Uu$ and $E=1$, $I=-1$ when $U<Ul$ and $E=-1$, $X=f(U)$ Where E is abnormality information or an operation command, I is a state indicative signal, U is an active power or frequency, Ul is a lower limit rated value of the active power or the frequency, and Uu is an upper limit rated value of the active power or the frequency.

As represented by the following expressions, the power control circuit 22 outputs 0.0 to the signal adder 23 when receiving I='0' from the state detecting circuit 21. The power control circuit 22 outputs to the signal adder 23, a control signal Y that allows an increase in the active power at the control target point to be restored at a high speed by a variation amount X detected by the state detecting circuit 21 or a function prepared in advance when receiving I='1'. The power control circuit 22 outputs to the signal adder 23, the control signal Y that allows a decrease in the active power at the control target point to be restored at a high speed by a variation amount X detected by the state detecting circuit 21 or a function prepared in advance when receiving I='−1'.

Y=F(x, I, t) (example: PID), or

Y=f(I, t) (example: step function).

The signal adder 23 adds an output of the power control circuit 22 to a steady operation command value P* of the adjustable speed machine to output the added value to an excitation control system of the adjustable speed machine.

As described above, according to this embodiment, the excitation control system of the adjustable speed machine controls the active power of the adjustable speed machine in accordance with the steady command value when the excitation control system of the adjustable speed machine normally operates. However, when an increase or a decrease in the power at the control target point is detected, the power control signal is supplied to the excitation control system of the adjustable speed machine to adjust (absorb or supply) the active power of the adjustable speed machine, thereby making it possible to restore the increase or the decrease in the transmission power of the transmission system at a high speed and to stop a voltage drop in the transmission system, whereby the voltage collapse can be prevented.

Third Embodiment

FIG. 3 is a block diagram for explanation of a power system voltage stabilizing method in accordance with a third embodiment of the present invention. In FIG. 3, reference numeral 31 denotes a state detecting circuit for detecting a system frequency change or an active power change and the voltage change at a control target point, 32 denotes a power control circuit for outputting a control signal for restoring an increase or a decrease in the active power at the control target point, and 33 denotes a signal adder.

Subsequently, a description will be given of an operation principle of the power system voltage stabilizing method according to the third embodiment of the present invention.

As represented by the following expressions, the state detecting circuit 31 always monitors an operation state and outputs to the power control circuit 32, a state indicative signal I of 0 when the state is normal, a state indicative signal I of 1 when the system frequency or the active power at the control target point increases to a rated value or more and the voltage at the control target point decreases to the rated value or less, and a state indicative signal I of −1 when the system frequency or the active power at the control target point decreases to the rated value or less, and the voltage at the control target point decreases to the rated value or less.

$I=0$ when $Uu>U>Ul$ and $V>Vc$, $I=1$ when $U>Uu$ and $V<Vc$, $I=-1$ when $U<Ul$ and $V<Vc$, $X=f(U)$ Where V is a voltage, Vc is a voltage lower limit rated value, I is a state indicative signal, U is an active power or frequency, Ul is a lower limit rated value of the active power or the frequency, and Uu is an upper limit rated value of the active power or the frequency.

As represented by the following expressions, the power control circuit 32 outputs 0.0 to the signal adder 33 when receiving I='0' from the state detecting circuit 31. The power control circuit 32 outputs to the signal adder 33, a control signal Y that allows an increase in the active power at the control target point to be restored at a high speed by a variation amount X detected by the state detecting circuit 31 or a function prepared in advance when receiving I=1'. The power control circuit 32 outputs to the signal adder 33, the control signal Y that allows a decrease in the active power at the control target point to be restored at a high speed by a variation amount X detected by the state detecting circuit 31 or a function prepared in advance when receiving I='−1'.

Y=F(x, I, t) (example: PID), or

Y=f (I, t) (example: step function).

The signal adder 33 adds an output of the power control circuit 32 to a steady operation command value P* of the adjustable speed machine to output the added value to an excitation control system of the adjustable speed machine.

As described above, according to this embodiment, the excitation control system of the adjustable speed machine controls the active power of the adjustable speed machine in accordance with the steady command value when the excitation control system of the adjustable speed machine normally operates. However, when an increase or a decrease in the power at the control target point is detected, the power control signal is supplied to the excitation control system of the adjustable speed machine to adjust (absorb or supply) the active power of the adjustable speed machine, thereby making it possible to restore the increase or the decrease in the transmission power of the transmission system at a high speed and to stop a voltage drop in the transmission system, whereby the voltage collapse can be prevented.

Fourth Embodiment

Figure 4:
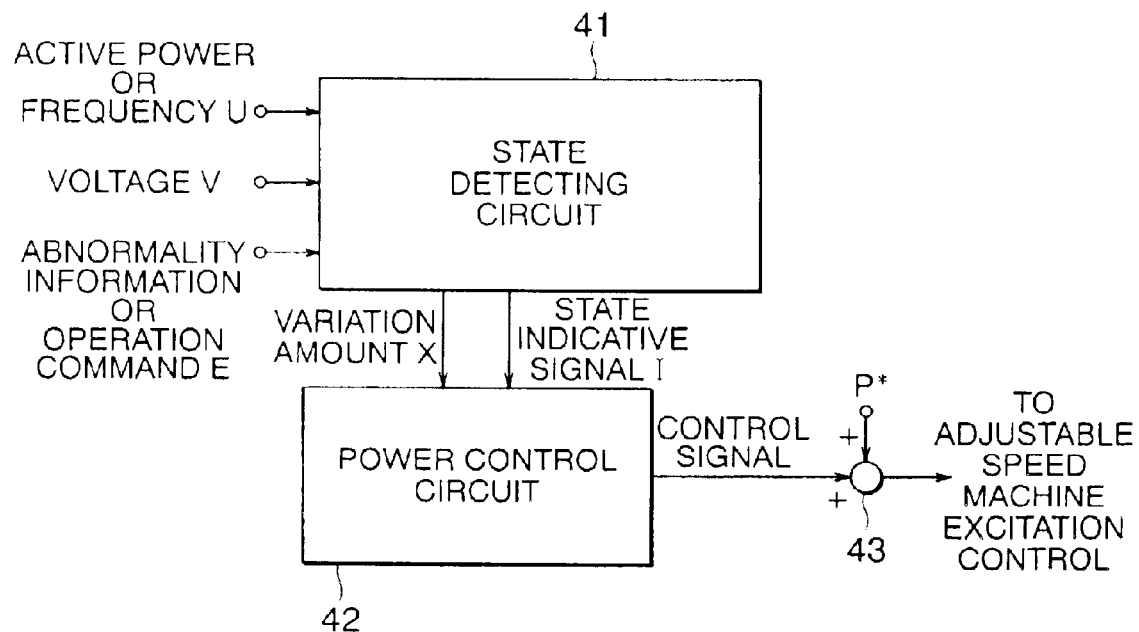
FIG. 4 is a diagram for explanation of an operation of a voltage stabilization control method in accordance with a fourth embodiment of the present invention.

FIG. 4 is a block diagram for explanation of a power system voltage stabilizing method in accordance with a fourth embodiment of the present invention. In FIG. 4, reference numeral 41 denotes a state detecting circuit for detecting a system frequency change or an active power change and a voltage change at a control target point, and abnormality information indicative of a fault occurrence or a load rapid change or an operation command, 42 denotes a power control circuit for outputting a control signal for restoring an increase or a decrease in the active power at the control target point, and 43 denotes a signal adder.

Subsequently, a description will be given of an operation principle of the power system voltage stabilizing method according to the fourth embodiment of the present invention.

As represented by the following expressions, the state detecting circuit 41 always monitors an operation state and outputs to the power control circuit 42, a state indicative signal I of 0 when the state is normal, a state indicative signal I of 1 when the system frequency or the active power at the control target point increases to a rated value or more, a voltage at the control target point decreases to the rated value or less, and the state detecting circuit 41 receives abnormality information of a power increase or an operation command, and a state indicative signal I of −1 when the system frequency or the active power at the control target point decreases to the rated value or less, the voltage at the control target point decreases to the rated value or less, and the state detecting circuit 41 receives the abnormality information of a power decrease or an operation command.

$I=0$ when $Uu>U>Ul$, $V>Vc$ and $E=0$, $I=1$ when $U>Uu$, $V<Vc$ and $E=1$, $I=-1$ when $U<Ul$, $V<Vc$ and $E=-1$, $X=f(U)$ Where V is a voltage, Vc is a voltage lower limit rated value, E is abnormality information or an operation command, I is a state indicative signal, U is an active power or frequency, Ul is a lower limit rated value of the active power or the frequency, and Uu is an upper limit rated value of the active power or the frequency.

The power control circuit 42 outputs 0.0 to the signal adder 43 when receiving I='0' from the state detecting circuit 41. The power control circuit 42 outputs to the signal adder 43, a control signal Y that allows an increase in the active power at the control target point to be restored at a high speed by a variation amount X detected by the state detecting circuit 41 or a function prepared in advance when receiving I='1'. The power control circuit 42 outputs to the signal adder 43, the control signal Y that allows a decrease in the active power at the control target point to be restored at a high speed by a variation amount X detected by the state detecting circuit 41 or a function prepared in advance when receiving I='−1'.

$Y=F(x, I, t)$ (example: PID), or $Y=f(I, t)$ (example: step function).

The signal adder 43 adds an output of the power control circuit 42 to a steady operation command value P* of the adjustable speed machine to output the added value to an excitation control system of the adjustable speed machine.

As described above, according to this embodiment, the excitation control system of the adjustable speed machine controls the active power of the adjustable speed machine in accordance with the steady command value when the excitation control system of the adjustable speed machine normally operates. However, when an increase or a decrease in the power at the control target point is detected, the power control signal is supplied to the excitation control system of the adjustable speed machine to adjust (absorb or supply) the active power of the adjustable speed machine, thereby making it possible to restore the increase or the decrease in the transmission power of the transmission system at a high speed and to stop a voltage drop in the transmission system, whereby the voltage collapse can be prevented.

Fifth Embodiment

Figure 5:
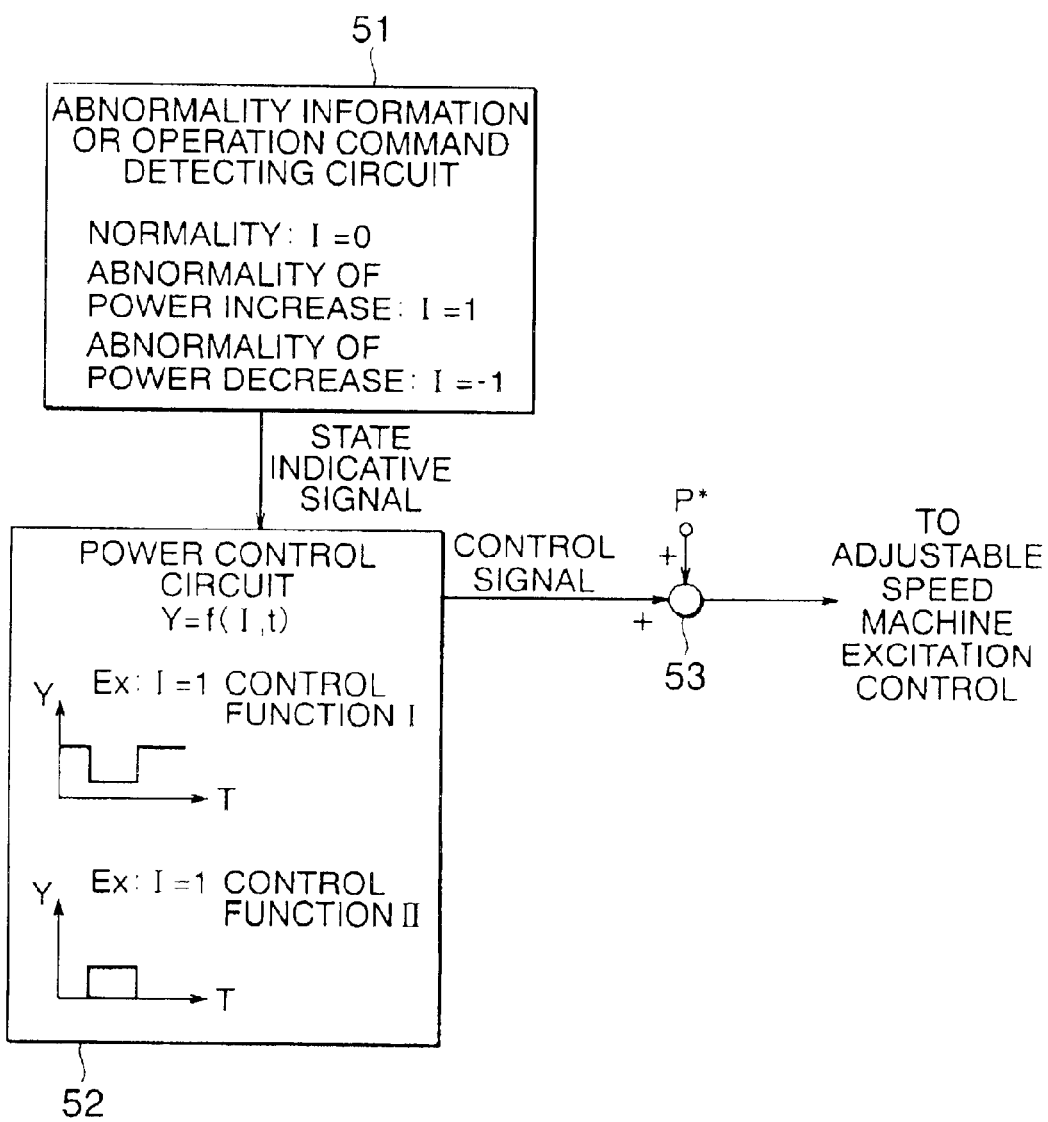
FIG. 5 is a diagram for explanation of an operation of a voltage stabilization control method in accordance with a fifth embodiment of the present invention.

FIG. 5 is a block diagram for explanation of a power system voltage stabilizing method in accordance with a fifth embodiment of the present invention. In FIG. 5, reference numeral 51 denotes an abnormality information or operation command detecting circuit for detecting an accident or a load rapid change, 52 denotes a power control circuit for outputting a control signal for restoring an increase or a decrease in the active power at the control target point, and 53 denotes a signal adder.

Subsequently, a description will be given of an operation principle of the power system voltage stabilizing method according to the fifth embodiment of the present invention.

As represented by the following expressions, the abnormality information or operation command detecting circuit 51 always monitors an operation state and outputs to the power control circuit 52, a state indicative signal I of 0 when the state is normal, a state indicative signal I of 1 when receiving the abnormality information of the power increase or the operation command, and a state indicative signal I of −1 when receiving the abnormality information of the power decrease or the operation command.

Normal: I=0,

Abnormality of the power increase: I=1, and

Abnormality of the power decrease: I=−1.

As shown in FIG. 5, the power control circuit 52 outputs 0.0 to the signal adder 53 when receiving I='0' from the abnormality information or operation command detecting circuit 51. The power control circuit 52 outputs to the signal adder 53, a control signal Y that allows an increase in the active power at the control target point to be restored at a high speed by a control function 1 prepared in advance when receiving I='1' (example: I=1, control function I). The power control circuit 52 outputs to the signal adder 53, the control signal Y that allows a decrease in the active power at the control target point to be restored at a high speed by a control function H prepared in advance when receiving I='−1' (example: I=−1, control function II).

The signal adder 53 adds an output of the power control circuit 52 to a steady operation command value P* of the adjustable speed machine to output the added value to an excitation control system of the adjustable speed machine.

As described above, according to this embodiment, the excitation control system of the adjustable speed machine controls the active power of the adjustable speed machine in accordance with the steady command value when the excitation control system of the adjustable speed machine normally operates. However, when an increase or a decrease in the power at the control target point is detected, the power control signal is supplied to the excitation control system of the adjustable speed machine to adjust (absorb or supply) the active power of the adjustable speed machine, thereby making it possible to restore the increase or the decrease in the transmission power of the transmission system at a high speed and to stop a voltage drop in the transmission system, whereby the voltage collapse can be prevented.

Sixth Embodiment

Figure 6:
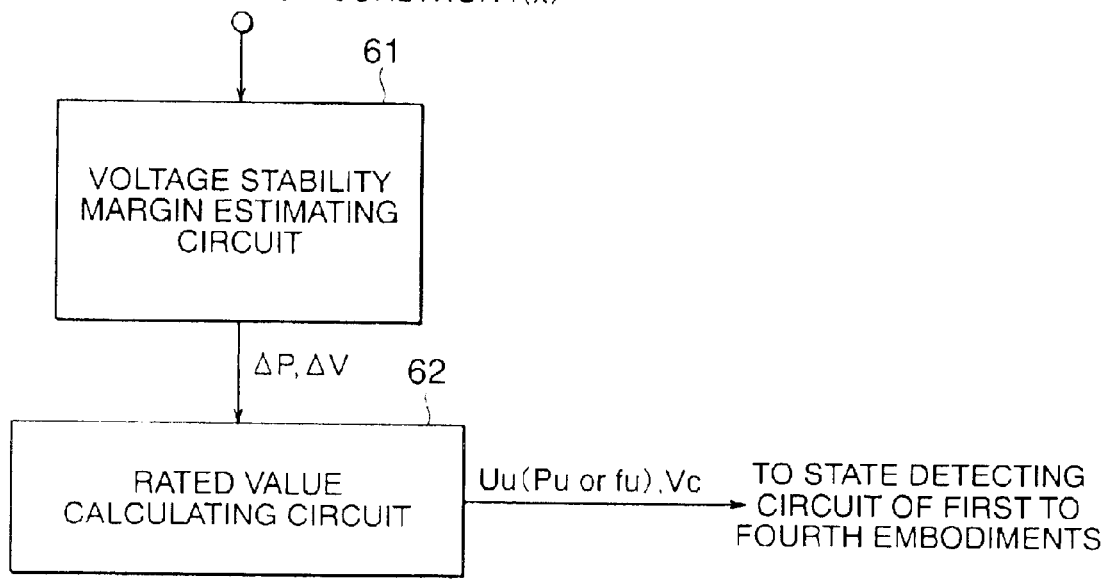
FIG. 6 is a diagram for explanation of an operation of a voltage stabilization control method in accordance with a sixth embodiment of the present invention.

FIG. 6 is a block diagram for explanation of a power system voltage stabilizing method in accordance with a sixth embodiment of the present invention. In FIG. 6, reference numeral 61 denotes a voltage stability margin estimating circuit that calculates a voltage stabilization margin of a transmission system in accordance with the operation information of a phase modifier for a system operation condition, located higher voltage side voltage control or SVG, or an LTC tap changer, and 62 denotes a rated value calculating circuit that automatically calculates and updates the rated value set forth in the above-mentioned first to fourth embodiments in accordance with the stabilization margin.

A description will be given of an operation principle of the control method of the adjustable speed machine in the power system voltage stabilizing method in accordance with the sixth embodiment of the present invention.

The voltage stability margin estimating circuit 61 calculates an active power limit value PH and a voltage stabilization limit value VH at the voltage stabilization limit of the transmission system in accordance with the operation information of a phase modifier for a system operation condition, located higher voltage side voltage control or SVG, or an LTC tap changer, and outputs a difference between an active power P and PH at the time of the transmission system steady operation, and a difference between the voltage V and VH to the rated value calculating circuit 62 as a stabilization margin.

$$P=PH-P$$

$$V=VH-V$$

$$PH=F1(H, S, L, f(x))$$

$$VH=F2(H, S, L, f(x))$$

Where P is an active power in steady operation at a control point, V is a voltage in the steady operation at the control point, PH is an active power stabilization limit, and VH is a voltage stabilization limit.

As represented by the following expressions, the rated value calculating circuit 62 automatically calculates and updates the rated value set forth in the above-mentioned first to fourth embodiments so as to set the frequency and the active power increase limit rated value to be higher when the active power stability margin from the voltage stability margin estimating circuit 61 is larger, and to set the frequency and the active power increase limit rated value to be lower when the active power stability margin is smaller, and also so as to set the voltage decrease limit rated value to be lower when the voltage stabilization margin from the voltage stability margin estimating circuit 61 is larger, and to set the voltage decrease limit rated value to be higher when the voltage stabilization margin is smaller.

Active power upper limit rated value: Pu=F1 (.P, V)

Frequency upper limit rated value: fu=F2 (.P, V)

Voltage lower limit rated value: Vc=F3 (.P, V)

As described above, according to this embodiment, since the voltage increase limit rated value is appropriately calculated and automatically updated in accordance with the stabilization margin of the transmission system, the effect of the voltage stabilization control can be further improved.

Seventh Embodiment

Figure 7:
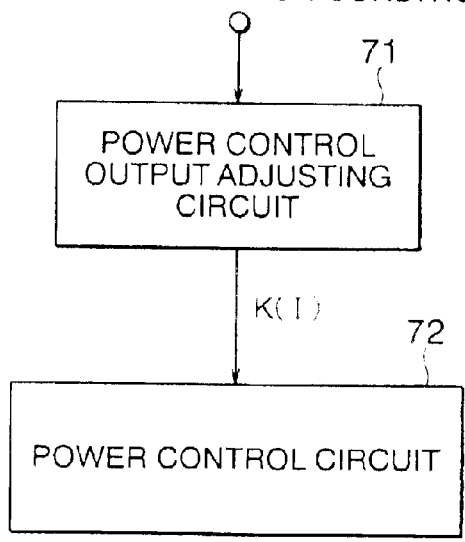
FIG. 7 is a diagram for explanation of an operation of a voltage stabilization control method in accordance with a seventh embodiment of the present invention.
Figure 8:
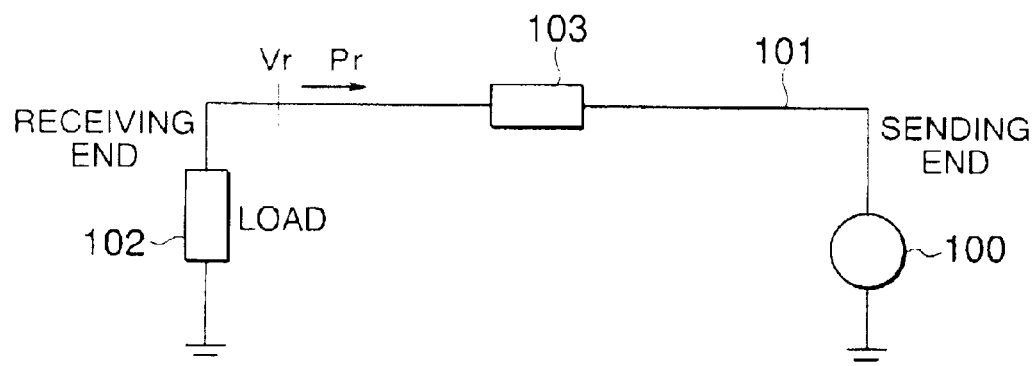
FIG. 8 is a circuit diagram showing the outline of a known transmission system.
Figure 9:
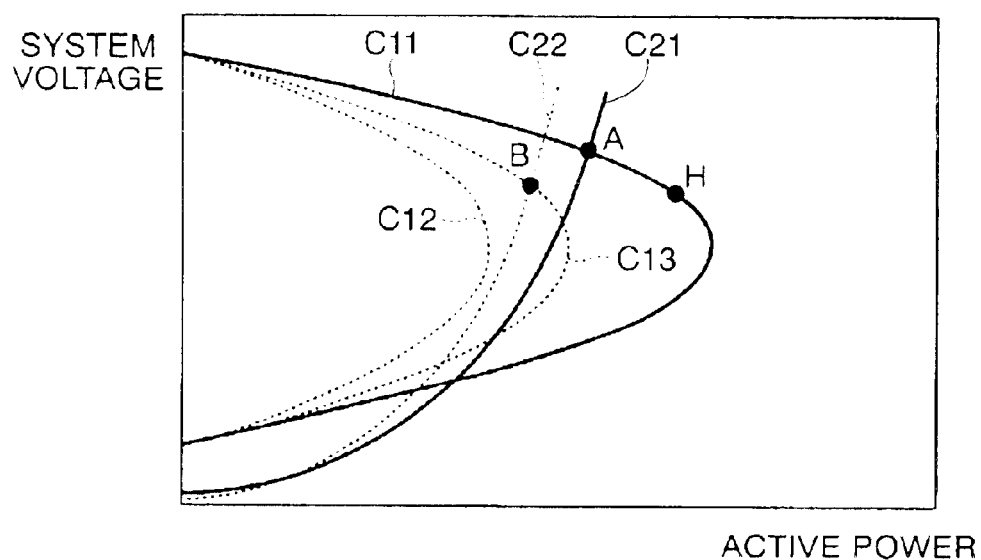
FIG. 9 is an explanatory diagram showing a known active power to a voltage P-V characteristic curve.

FIG. 7 is a block diagram for explanation of a power system voltage stabilizing method in accordance with a seventh embodiment of the present invention. In the figure, reference numeral 71 denotes a power control output adjusting circuit that adjusts the output of the power control in accordance with the operation information of a phase modifier for a system operation condition, located higher voltage side voltage control or SVG, or an LTC tap changer, and 72 denotes a power control circuit set forth in the above-mentioned first to fifth embodiments of the present invention.

A description will be given of an operation principle of the control method of the adjustable speed machine in the power system voltage stabilizing method in accordance with the seventh embodiment of the present invention. As represented by the following expressions, the power control output adjusting circuit 71 outputs the respective output adjustment gains K(1) and K(-1) to the power control circuit 72 in cases of the power increase and the power decrease so that the device is located in accordance with the operation information of a phase modifier for located higher voltage side voltage control or SVG, or an LTC tap changer, and the power control output is small and the device is not located when the operation is enabled, or the power control output is large when the function is limited.

Case of the power increase: K(1)=f1(H, S, L),

Case of the power decrease: K(-1)=f2(H, S, L)

In the power control circuit 72 according to the first to fifth embodiments, the output from the power control output adjusting circuit 71 adjusts the output of the power control by K(1) in case of the power increase, and adjusts the output of the power control by K(-1) in case of the power decrease.

$$Y=F(K(I), x, I, t)$$

$$Y=f(K(I), I, t)$$

As described above, according to this embodiment, if the output of the power control of the adjustable speed machine is appropriately adjusted in accordance with the circumstances such as the voltage control and the reactive power control of the transmission system, the effect of the voltage stabilization control can be further improved.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A voltage stabilization control method for controlling a voltage of a power system that is connected to an adjustable speed machine, comprising:

detecting a change of a condition of a power system;

outputting a control signal indicative of an adjustment, when adjustment of active power of an adjustable speed machine is required, based on the change of the condition of the power system;

receiving a steady operation command value with respect to the adjustable speed machine, generating a stabilization control signal by adding the control signal to the steady operation command value, and outputting the stabilization control signal to the adjustable speed machine; and controlling the active power of the adjustable speed machine in accordance with the stabilization control signal so that power transmitted on a transmission line does not exceed a limit range in which system voltage is maintained, when the power transmitted rapidly increases due to acceleration of generators connected to the power system or demand for power at a load connected to the power system.

2. The voltage stabilization control method as claimed in claim 1, wherein the change of the condition of the power system comprises an active power change of the power system.

3. The voltage stabilization control method as claimed in claim 1, wherein the change of the condition of the power system comprises a frequency change of the power system.

4. The voltage stabilization control method as claimed in claim 1, wherein the change of the condition of the power system comprises a voltage change of the power system.

5. The voltage stabilization control method as claimed in claim 1, wherein power demand at the load is supplied by controlling the active power of the adjustable speed machines, based on the stabilization control signal.

6. The voltage stabilization control method as claimed in claim 5, wherein the active power of the adjustable speed machine is adjusted when the frequency of the power system exceeds an operation rated range.

7. The voltage stabilization control method as claimed in claim 5, including detecting one of abnormality information and an operation command, each indicating a change in power demand of the power system, wherein the active power of the adjustable speed machine is adjusted when the frequency of the power system exceeds an operation rated range, and one of the abnormality information and the specific operation command is received.

8. The voltage stabilization control method as claimed in claim 5, wherein the active power of the adjustable speed machine is adjusted when the frequency of the power system exceeds an operation rated range, and voltage at a control target point becomes a rated value or less.

9. The voltage stabilization control method as claimed in claim 5, including detecting one of abnormality information and an operation command, each indicating a change in power demand of the power system, wherein the active power of the adjustable speed machine is adjusted when the frequency of the power system exceeds an operation rated range, a voltage at a control target point becomes a rated value or less, and one of the abnormality information and the specific operation command is received.

10. The voltage stabilization control method as claimed in claim 5, wherein the active power of the adjustable speed machine is adjusted when the active power at a control target point exceeds an operation rated range.

11. The voltage stabilization control method as claimed in claim 5, including detecting one of abnormality information and an operation command, each indicating a change in power demand of the power system, wherein the active power of the adjustable speed machine is controlled when the active power at a control target point exceeds an operation rated range, and one of the abnormality information and the specific operation command is received.

12. The voltage stabilization control method as claimed in claim 5, wherein the active power of the adjustable speed machine is controlled when the active power at a control target point exceeds an operation rated range, and a voltage at the control target point becomes a rated value or less.

13. The voltage stabilization control method as claimed in claim 5, including detecting one of abnormality information and an operation command, each indicating a change in vower demand of the vower system, wherein the active power of the adjustable speed machine is controlled when the active power at a control target point exceeds an operation rated range, a voltage at the control target point becomes a rated value or less, and one of the abnormality information and the specific operation command is received.

14. The voltage stabilization control method as claimed in claim 5, including detecting one of abnormality information and operation command indicating a change in vower demand of the vower system, wherein the active power of the adjustable speed machine is controlled by a function when one of the abnormality information and the specific operation command signal is received.

15. The voltage stabilization control method as claimed in claim 1, wherein a voltage stability margin of the power system is estimated in accordance with
a system operation condition and a voltage control function at a higher voltage side,
phase modifying equipment,
operation state of a tap changer, and
a rated value that determines an increase in the active power in accordance with the voltage stability margin is automatically calculated and updated.

16. A voltage stabilization control apparatus for controlling a voltage of a power system that is connected to an adjustable speed machine, comprising:
detecting means for detecting a change of a condition of a power system;
control signal outputting means for outputting a control signal indicative of an adjustment when adjustment of the active power of an adjustable speed machine is required, based on the change of the condition of the power system;
stabilization control signal outputting means for receiving a steady operation command value with respect to the adjustable speed machine, generating a stabilization control signal by adding the control signal to the steady operation command value, and outputting the stabilization control signal to the adjustable speed machine; and
active power means for controlling the active power of the adjustable speed machine in accordance with the stabilization control signal so that power transmitted on a transmission line does not exceed a limit range in which system voltage is maintained, when the power transmitted rapidly increases due to acceleration of generators connected to the power system, increase or demand for power at a load connected to the power system.

17. The voltage stabilization control apparatus as claimed in claim 16, wherein the change of the condition of the power system comprises an active power change of the power system.

18. The voltage stabilization control apparatus as claimed in claim 16, wherein the change of the condition of the power system comprises a frequency change of the power system.

19. The voltage stabilization control apparatus as claimed in claim 16, wherein the change of the condition of the power system comprises a voltage change of the power system.

* * * * *

UNITED STATES PATENT AND TRADEMARK OFFICE
CERTIFICATE OF CORRECTION

PATENT NO. : 6,794,855 B2
DATED : September 21, 2004
INVENTOR(S) : Shimomura et al.

It is certified that error appears in the above-identified patent and that said Letters Patent is hereby corrected as shown below:

Column 12,
Line 7, change "vower" to -- power -- (both locations)
Line 14, change "vower" to -- power --
Line 15, change "vower" to -- power --

Signed and Sealed this

Fifteenth Day of February, 2005

JON W. DUDAS
*Director of the United States Patent and Trademark Office*